UNITED STATES PATENT OFFICE.

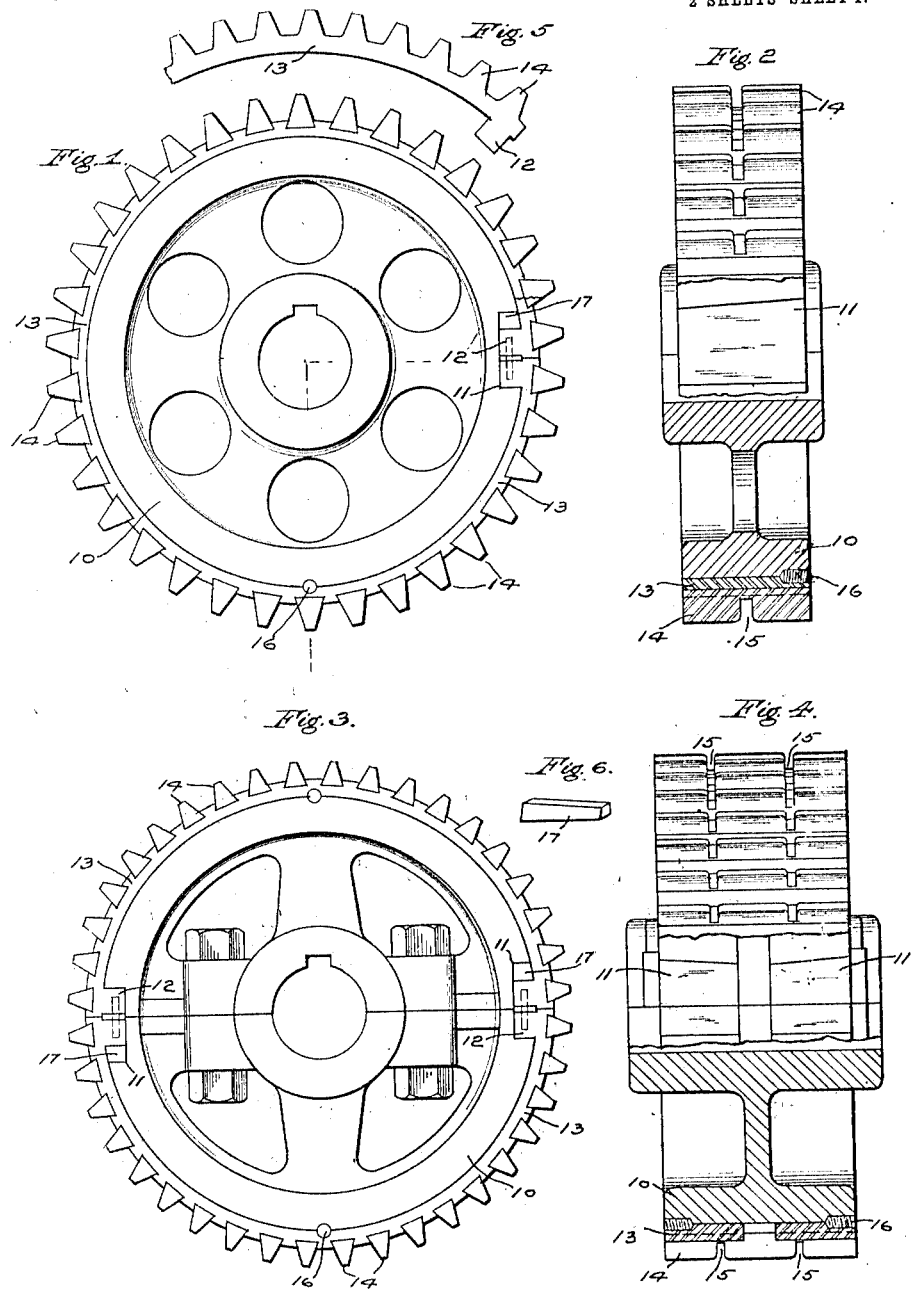

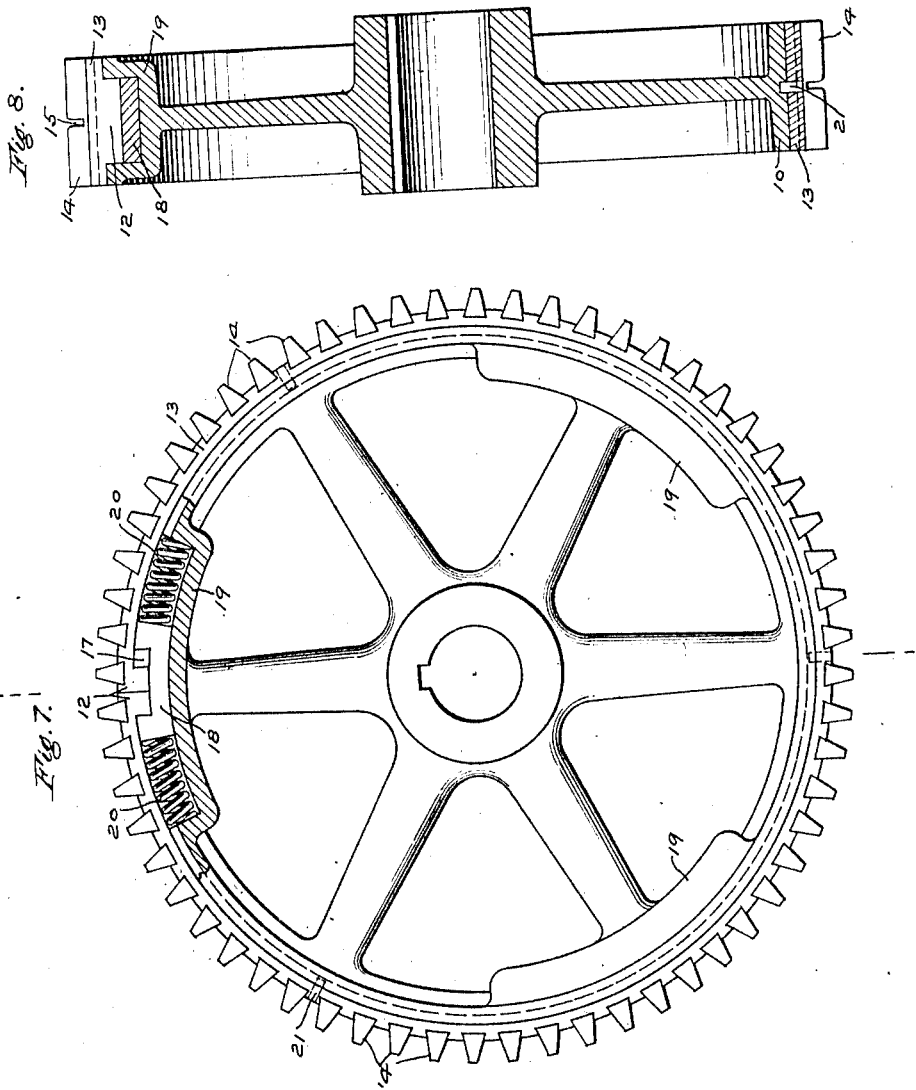

FRANK L. MORSE, OF TRUMANSBURG, NEW YORK, ASSIGNOR TO MORSE CHAIN COMPANY, OF ITHACA, NEW YORK, A CORPORATION OF NEW YORK.

SPROCKET-WHEEL.

1,071,946.   Specification of Letters Patent.   Patented Sept. 2, 1913.

Application filed August 17, 1906. Serial No. 331,021.

*To all whom it may concern:*

Be it known that I, FRANK L. MORSE, a citizen of the United States, residing at Trumansburg, in the county of Tompkins and State of New York, have invented new and useful Improvements in Sprocket-Wheels, of which the following is a specification.

This invention relates in general to gear wheels, and more particularly to sprocket gear wheels, the principal object being to provide a removable rim carrying the sprocket or gear teeth, which rim may be readily detached and removed or replaced with another rim when the teeth or the sprocket chain operating thereon becomes worn.

In the operation of chain drives for power purposes, the chain is subject to wear at its joints, which, after a time produces a lengthening of the chain by a slight increase in the pitch, which is termed "stretching". The chain is then not by any means worn out, but is still in good condition for useful service, but it will not operate successfully on sprocket wheels of the same pitch, since the pitch of the chain has increased. It is then proposed, according to my present invention, to remove the rim of sprocket teeth from the wheel and to replace the same with a rim carrying sprocket teeth of a greater pitch which will substantially fit the pitch of the partially worn chain and thereby double or treble the useful life of the chain, and in fact make it possible to keep the chain in service until it is substantially worn out. As the cost of material and manufacture of heavy drive chains is very expensive, it will be evident that by means of my improvement the cost of operation may be reduced more than one-half.

In the accompanying drawings, Figure 1 is a side elevation of one form of a sprocket wheel which may be employed in the practice of my invention; Fig. 2 an end view, the lower part of the wheel being indicated in vertical section; Figs. 3 and 4 views similar to Figs. 1 and 2 respectively, but showing a slightly modified form of sprocket wheel; Fig. 5 a view of a portion of a removable rim carrying sprocket teeth formed integrally therewith; Fig. 6 a detail view of a wedge which may be employed for clamping the rim to the body of the wheel; Fig. 7 a side view, partially in section, showing another modification of my improvement applied to a spring sprocket wheel; and Fig. 8 a vertical section of the structure shown in Fig. 7.

According to the construction shown in Figs. 1 and 2, the wheel body 10 has a substantially cylindrical periphery and is provided with one or more recesses 11 for receiving the inwardly projecting lugs 12 formed at the ends of the sections of the rim 13, which carries the sprocket teeth 14. These teeth are preferably attached to the rim by a dovetailed connection, as indicated, but may be formed integral therewith, if desired, as shown in Fig. 5.

The rim 13 is preferably formed of rolled metal, which may be bent to a circular form adapted to fit the periphery of the body of the wheel, and may be formed in two or more sections, as indicated in Figs. 3 and 4.

A wedge 17 may be driven into the recess 11, between the wheel body and the lugs 12 of the rim and the lugs may be keyed together for securely holding the rim in place. Set screws 16 may also be used to prevent sidewise movement of the rim upon the wheel. Notches 15 may be cut in the sprocket teeth for engaging guide plates on the links and preventing lateral displacement of the chain upon the sprocket wheels.

My improvement is also applicable to spring sprocket wheels, as shown in Figs. 7 and 8, wherein the wheel body is provided with one or more casings 19 containing a chamber in which are located two springs 20 and an intermediate block 18 having a recess for receiving the lugs 12 of the sections of the removable rim 13 having teeth 14. The rim may be fastened to the block by means of wedges 17 in a manner similar to that before described and the rim may be provided with pins 21 for engaging a circumferential groove in the periphery of the wheel for permitting relative movement between the wheel and rim as the power is transmitted from one to the other through the coiled springs 20, as will be readily understood.

The preferred method of operating chain drives, according to my improvement, is to carry on hand two or more rims for each wheel having sprocket teeth of different pitch, and, after running the chain on rims of standard pitch until the chain has become worn and its pitch increased, to replace the rims with corresponding ones having sprocket teeth set at a greater pitch. The chain then again runs smoothly and efficiently for another long period. This operation may be repeated as many times as found practicable in actual use to prolong the life of the chain.

The rim is rigid in form and may be readily applied to or removed from the wheel by removing the set screws or pins and sliding the rim laterally on the periphery of the wheel.

Having now described my invention, what I claim as new and desire to secure by Letters Patent, is:—

1. A sprocket wheel comprising a wheel body having a recessed periphery, a removable rim of a rigid circular form carrying sprocket teeth and having lugs projecting into said recess, and wedge means for fastening the lugs therein.

2. A sprocket wheel comprising a wheel body having a recess in its periphery, a removable rim of rigid circular form carrying sprocket teeth and mounted on the periphery of the wheel body with the capacity of relative circumferential movement, a block secured to said rim and extending into said recess, and a spring for transmitting the stress between the block and the wheel body.

3. A sprocket wheel comprising a wheel body having a chamber in its periphery, a spring contained therein, a removable rim of rigid circular form carrying sprocket teeth and mounted on the periphery of the wheel body with the capacity of relative circumferential movement, and means rigidly secured to said rim and extending into said chamber for engaging said spring.

In testimony whereof I have hereunto set my hand.

FRANK L. MORSE.

Witnesses:
DORA L. EARL,
ALICE C. WELSH.